United States Patent
Miyajima et al.

(10) Patent No.: US 10,873,703 B2
(45) Date of Patent: Dec. 22, 2020

(54) IMAGING CONTROL APPARATUS, CONTROL METHOD OF AN IMAGING CONTROL APPARATUS, AND NON-TRANSITORY COMPUTER READABLE MEDIUM

(71) Applicant: CANON KABUSHIKI KAISHA, Tokyo (JP)

(72) Inventors: Takuro Miyajima, Kawasaki (JP); Koji Yoshida, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/456,382

(22) Filed: Jun. 28, 2019

(65) Prior Publication Data
US 2020/0007788 A1 Jan. 2, 2020

(30) Foreign Application Priority Data
Jun. 29, 2018 (JP) .................................. 2018-125356

(51) Int. Cl.
H04N 9/73 (2006.01)
H04N 5/232 (2006.01)

(52) U.S. Cl.
CPC ... *H04N 5/232939* (2018.08); *H04N 5/23216* (2013.01); *H04N 9/735* (2013.01)

(58) Field of Classification Search
CPC .................................. H04N 9/73; H04N 9/735
USPC ...................................................... 348/223.1
See application file for complete search history.

(56) References Cited

U.S. PATENT DOCUMENTS

| 7,110,032 B2* | 9/2006 | Furukawa | H04N 5/235 348/333.02 |
| 7,212,234 B2* | 5/2007 | Sakaguchi | H04N 5/23293 348/223.1 |
| 7,525,697 B2* | 4/2009 | Suekane | H04N 1/6011 348/222.1 |
| 2008/0062274 A1* | 3/2008 | Hamamura | H04N 9/735 348/223.1 |
| 2012/0236173 A1* | 9/2012 | Telek | G03B 7/00 348/223.1 |

FOREIGN PATENT DOCUMENTS

JP    2001-324750 A    11/2001

* cited by examiner

*Primary Examiner* — Anthony J Daniels
(74) *Attorney, Agent, or Firm* — Cowan, Liebowitz & Latman, P.C.

(57) ABSTRACT

An imaging control apparatus includes: a first operating member to select any of a plurality of options respectively corresponding to a plurality of settings including at least auto, daylight, and fluorescent, which relate to white balance; a second operating member; and a control unit to perform control (1) to change white balance to a setting corresponding to a predetermined option in response to operation of the second operating member in a case where the setting of white balance is not a setting corresponding to the predetermined option among the plurality of options, and (2) to change white balance to another type of setting among a plurality of types of settings corresponding to the predetermined option in response to operation of the second operating member in a case where the setting of white balance is a setting corresponding to the predetermined option.

17 Claims, 7 Drawing Sheets

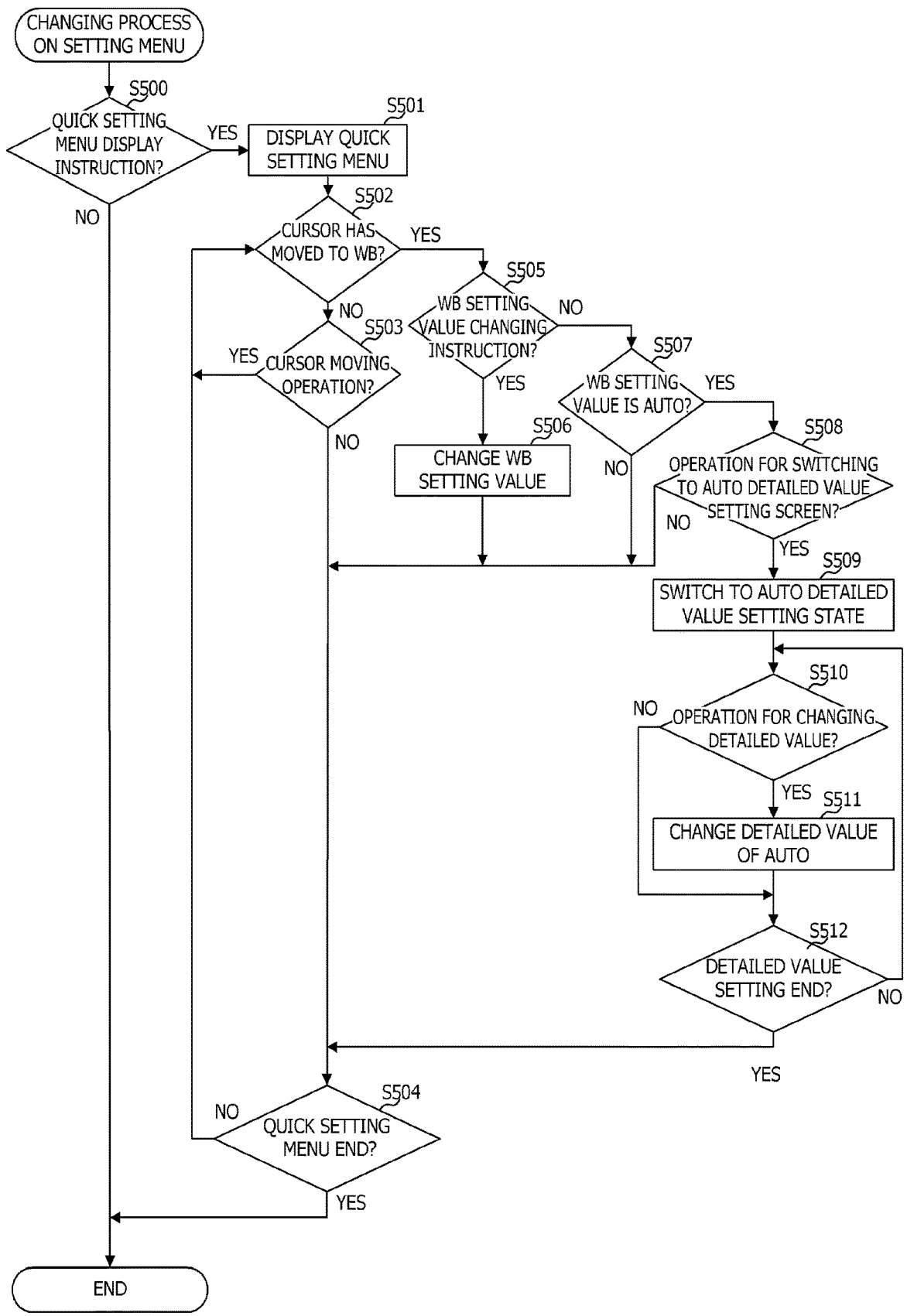

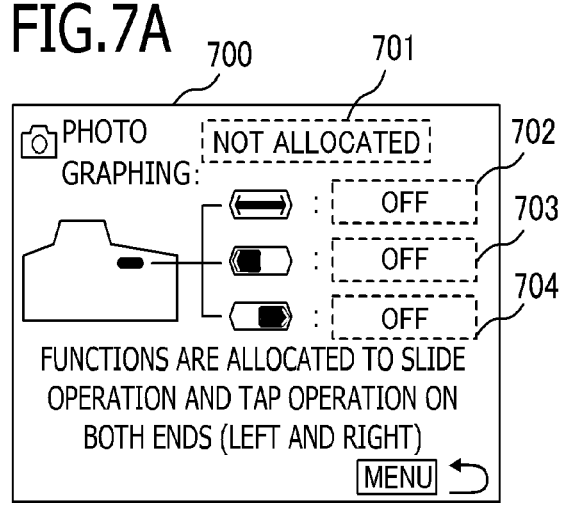
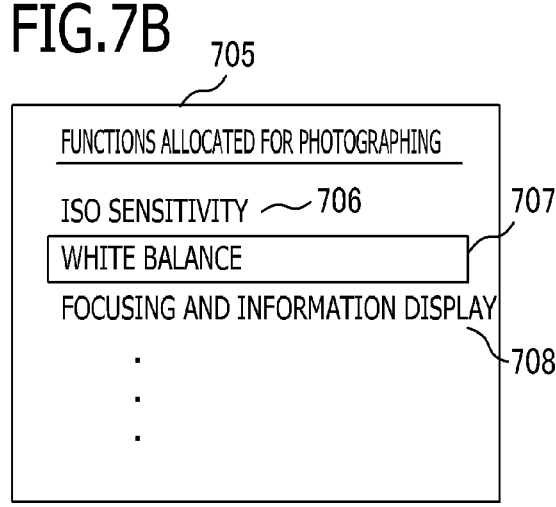
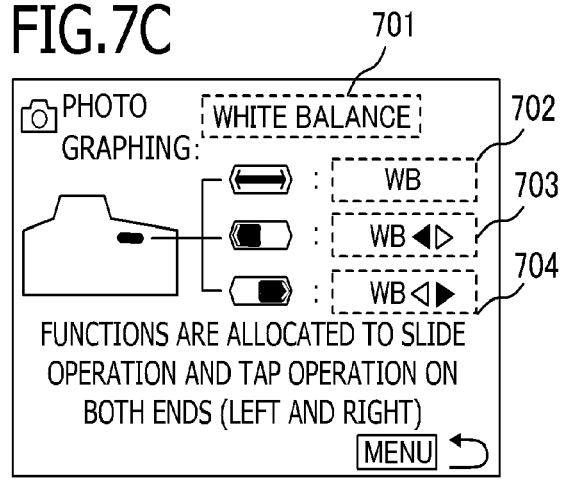
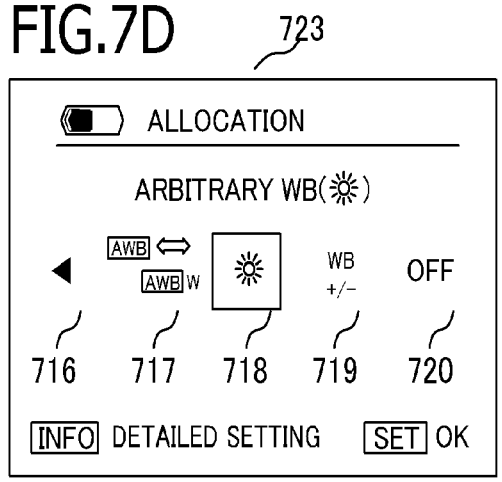
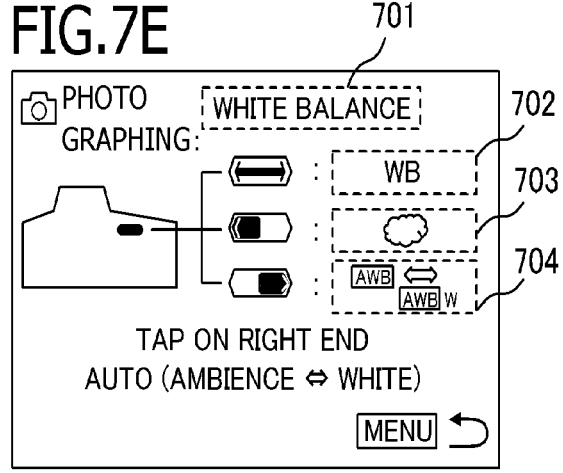

IMAGING CONTROL APPARATUS, CONTROL METHOD OF AN IMAGING CONTROL APPARATUS, AND NON-TRANSITORY COMPUTER READABLE MEDIUM

BACKGROUND OF THE INVENTION

Field of the Invention

The present invention relates to an imaging control apparatus, a control method of an imaging control apparatus, and a non-transitory computer readable medium.

Description of the Related Art

Japanese Patent Application Laid-Open No. 2001-324750 discloses a method of displaying a present setting content without changing setting values when a user operates the settings of an imaging device and the setting content is not displayed on a display unit and changing the setting values and displaying the content thereof when the setting content is displayed on the display unit.

Here, in setting of an imaging device, a white balance is one of important parameters when performing photographing. For example, a user may miss a shutter chance unless a white balance is changed quickly when the user changes a composition so that the color of a subject is changed a lot (when the camera follows a moving object so that a backlit condition is switched to a front-lit condition or when the user walks from the indoor to the outdoor).

SUMMARY OF THE INVENTION

Although a white balance can be generally set by selecting any one of options including auto (AWB), daylight, fluorescent, and the like, a plurality of types of white balance settings may be selected within auto settings. When a plurality of types of settings included in such a predetermined setting of auto is included in options of the same row as daylight, fluorescent, and the like, the number of options through which the user has to pass until reaching a desired setting increases, which prevents quick changing of settings. On the other hand, when a predetermined setting is set and a detailed setting screen for selecting a type with another operation is displayed so that the user can select a type, it is not possible to quickly perform a type changing operation. Japanese Patent Application Laid-Open No. 2001-324750 does not take such a white balance setting method into consideration.

Therefore, an object of the present invention is to provide a technique capable of quickly changing the setting of white balance.

The present invention in its first aspect provides an imaging control apparatus includes: a first operating member configured to select any of a plurality of options respectively corresponding to a plurality of settings including at least auto, daylight, and fluorescent, which relate to white balance; a second operating member; and at least one memory and at least one processor which function as: a control unit configured to perform control: to change white balance to a setting corresponding to a predetermined option in response to operation of the second operating member in a case where the setting of white balance is not a setting corresponding to the predetermined option among the plurality of options, and to change white balance to another type of setting among a plurality of types of settings corresponding to the predetermined option in response to operation of the second operating member in a case where the setting of white balance is a setting corresponding to the predetermined option.

According to the present invention, it is possible to provide a technique capable of quickly changing the setting of white balance.

Further features of the present invention will become apparent from the following description of exemplary embodiments with reference to the attached drawings.

BRIEF DESCRIPTION OF THE DRAWINGS

FIG. 5 is a flowchart illustrating an example of a setting process according to the present embodiment.

FIGS. 7A to 7E are screens for allocating functions to a touch bar according to the present embodiment.

DESCRIPTION OF THE EMBODIMENTS

Embodiment

<External View of Digital Camera 100>

Figure 1A:
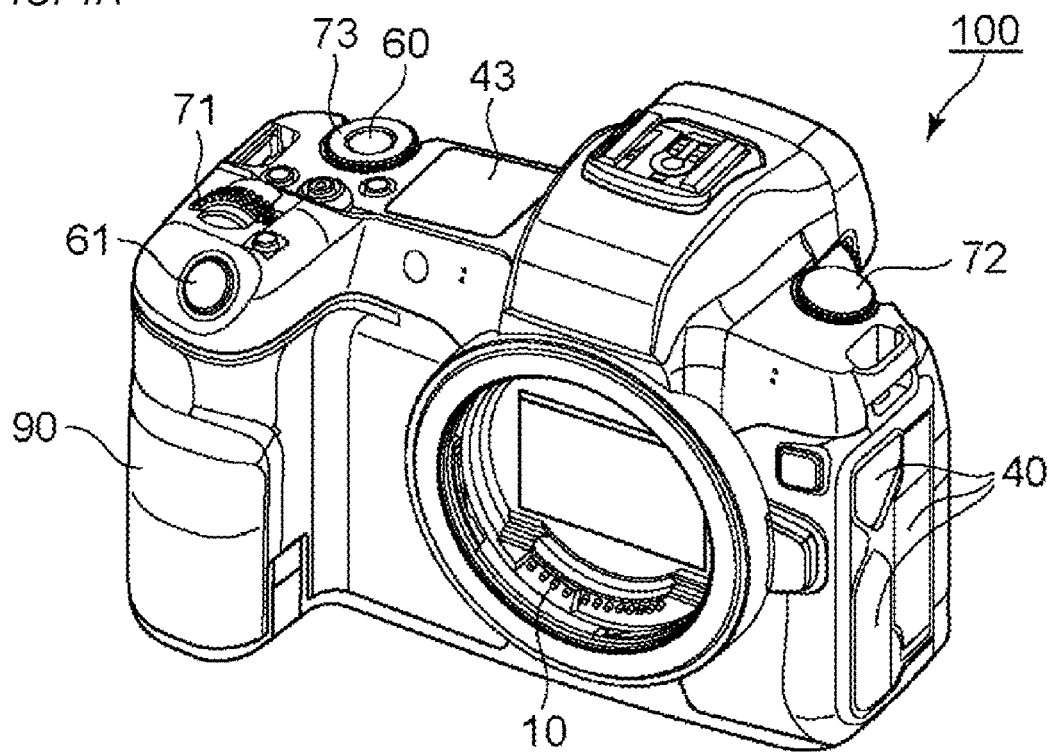
FIGS. 1A and 1B are external views of a digital camera 100.
Figure 1B:
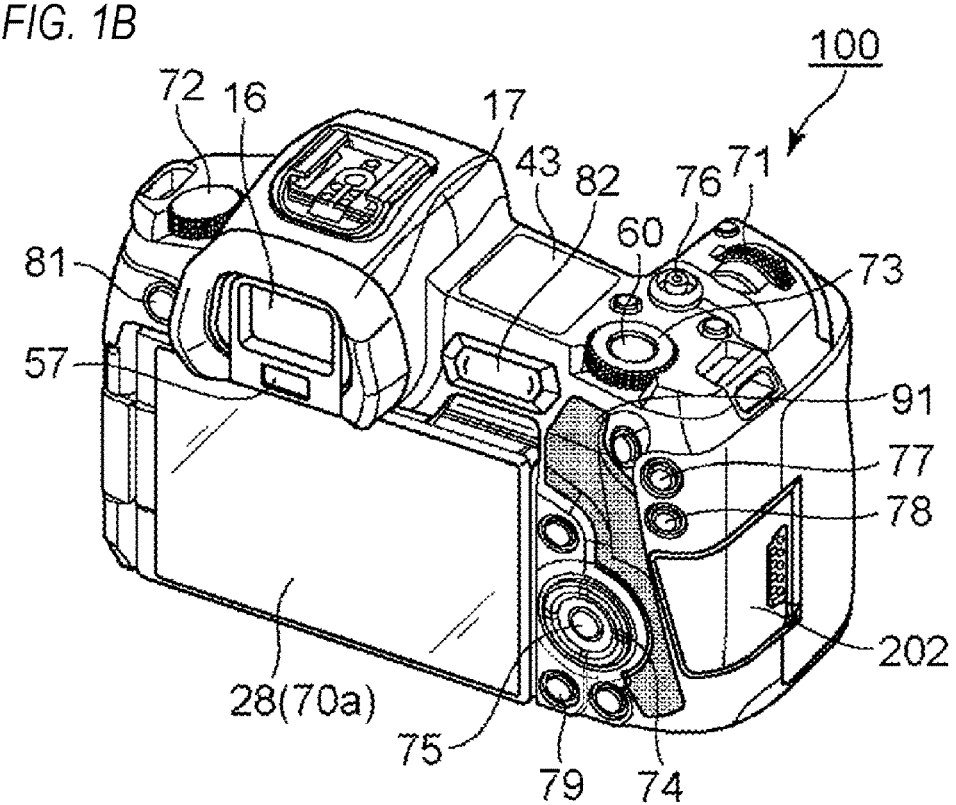

Hereinafter, a preferred embodiment of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. A touch panel 70a is capable of detecting a touch operation performed on a display surface (a touch operation surface) of the display unit 28. A finder outer display unit 43 is a display unit provided on an upper surface of the digital camera 100 for displaying various setting values of the digital camera 100 including a shutter speed and an aperture. A shutter button 61 is an operation member for issuing a photography instruction. A mode changeover switch 60 is an operation member for switching between various modes. A terminal cover 40 is a cover for protecting a connector (not shown) to which is connected a connection cable or the like for connecting the digital camera 100 to an external device.

A main electronic dial 71 is a rotating operation member and, by turning the main electronic dial 71, setting values such as a shutter speed and an aperture can be changed. A power switch 72 is an operation member for switching power of the digital camera 100 on and off. A sub electronic dial 73 is a rotating operation member and, by turning the sub electronic dial 73, operations such as moving a selection frame (cursor) and image feeding can be performed. A four-way key 74 is configured such that upper, lower, left, and right portions thereof are respectively depressible, and enables a process corresponding to a depressed portion of the four-way key 74 to be performed. A SET button 75 is a push button mainly used to determine a selected item.

A moving image button 76 is used to issue instructions to start or stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) can be enlarged or reduced. In a playback mode, the enlargement button 78 functions as an operation button for enlarging a playback image or increasing an enlargement rate of the playback image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display unit 28. A menu button 81 is a push button used for performing an instruction operation to display a menu screen and, when the menu button 81 is pushed, a menu screen enabling various settings to be performed is displayed on the display unit 28. A user can intuitively perform various settings using the menu screen displayed on the display unit 28, the four-way key 74, and the SET button 75.

A touch bar 82 (multi-function bar: M-Fn bar) is a linear touch operation member (line touch sensor) capable of accepting a touch operation. The touch bar 82 is arranged at a position where a touch operation can be performed on the touch bar 82 (where the touch bar 82 is touchable) by the thumb of a right hand gripping a grip portion 90 in a normal grip (a grip recommended by a manufacturer). The touch bar 82 is an accepting unit capable of accepting a tap operation (an operation involving touching and then releasing the touch without movement within a prescribed period of time), leftward and rightward slide operations (operations involving touching and then moving a touch position while maintaining the touch), and the like with respect to the touch bar 82. The touch bar 82 is an operation member that differs from the touch panel 70*a* and is not equipped with a display function.

A communication terminal 10 is a communication terminal used by the digital camera 100 to communicate with a lens unit 150 (to be described later; attachable and detachable). An eyepiece 16 is an eyepiece of an eyepiece finder 17 (a look-in finder), and the user can visually confirm, via the eyepiece 16, an image displayed on an internal EVF 29 (to be described later). An eye proximity detecting unit 57 is an eye proximity detection sensor that detects whether or not the eye of the user (photographer) is approaching the eyepiece 16. A lid 202 is a lid of a slot in which the recording medium 200 (to be described later) is stored. The grip portion 90 is a holding portion configured in a shape readily gripped by the right hand of the user when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip portion 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest portion 91 (a thumb standby position) is a grip member provided at a location where the thumb of the right hand gripping the grip portion 90 can be readily placed on a rear side of the digital camera 100 in a state where none of the operation members are being operated. The thumb rest portion 91 is constituted by a rubber member or the like in order to enhance holding force (grip feeling).

<Configuration Block Diagram of Digital Camera 100>

Figure 2:
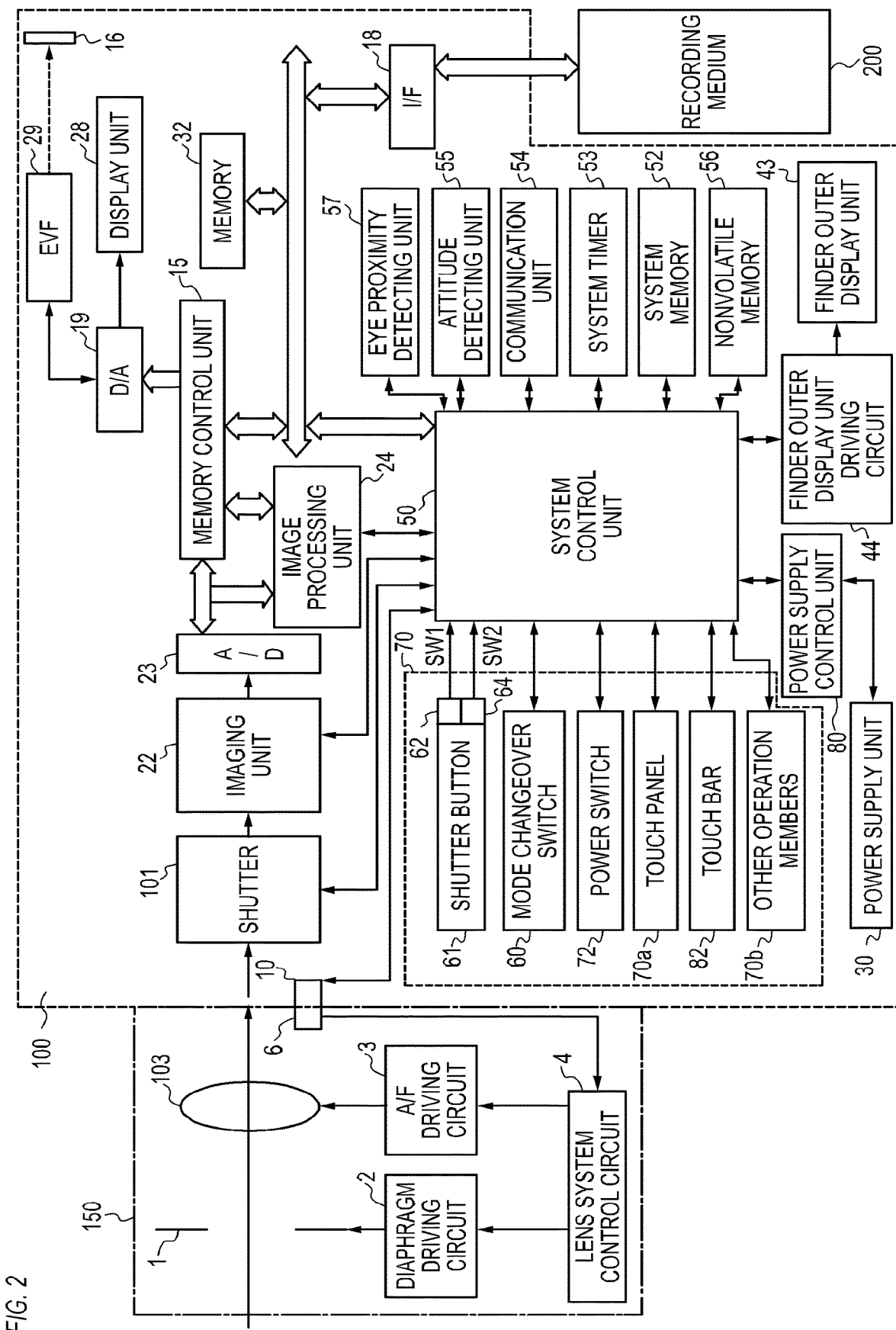
FIG. 2 is a block diagram of the digital camera 100.

FIG. 2 is a block diagram showing a configuration example of a digital camera 100. The lens unit 150 is a lens unit mounted with a replaceable photographing lens. While the lens 103 is usually configured by a plurality of lenses, in FIG. 2, the lens 103 is shown simplified with only one lens. A communication terminal 6 is a communication terminal used by the lens unit 150 to communicate with the digital camera 100, and a communication terminal 10 is a communication terminal used by the digital camera 100 to communicate with the lens unit 150. The lens unit 150 communicates with a system control unit 50 via the communication terminals 6 and 10. In addition, the lens unit 150 controls a diaphragm 1 via a diaphragm driving circuit 2 using an internal lens system control circuit 4. Furthermore, the lens unit 150 performs focusing by displacing a position of the lens 103 via an AF driving circuit 3 using the lens system control circuit 4.

A shutter 101 is a focal plane shutter capable of freely controlling an exposure time of an imaging unit 22 under the control of the system control unit 50.

The imaging unit 22 is an imaging element constituted by a CCD, a CMOS element, or the like which converts an optical image into an electrical signal. The imaging unit 22 may have an imaging surface phase difference sensor that outputs information on a defocusing amount to the system control unit 50. An A/D converter 23 converts an analog signal output from the imaging unit 22 into a digital signal.

An image processing unit 24 performs prescribed processes (pixel interpolation, a resizing process such as reduction, a color conversion process, and the like) on data from the A/D converter 23 or data from a memory control unit 15. In addition, the image processing unit 24 performs a prescribed computing process using image data of a captured image, and the system control unit 50 performs exposure control and ranging control based on a computation result obtained by the image processing unit 24. Accordingly, processes such as an AF (automatic focusing) process, an AE (automatic exposure) process, and an EF (preliminary light emission before flash) process in a TTL (through-the-lens) system are performed. The image processing unit 24 further performs a prescribed computing process using image data of a captured image and performs an AWB (automatic white balance) process in the TTL system based on an obtained computation result.

Output data from the A/D converter 23 is written into a memory 32 via the image processing unit 24 and the memory control unit 15. Alternatively, output data from the A/D converter 23 is written into the memory 32 via the memory control unit 15 without involving the image processing unit 24. The memory 32 stores image data obtained by the imaging unit 22 and converted into digital data by the A/D converter 23 and image data to be displayed on the display unit 28 and the EVF 29. The memory 32 has sufficient storage capacity for storing a prescribed number of still images, a prescribed time's worth of moving images, and audio.

In addition, the memory 32 also doubles as a memory (video memory) for image display. A D/A converter 19 converts data for image display stored in the memory 32 into an analog signal and supplies the analog signal to the display unit 28 and the EVF 29. In this manner, image data for display having been written into the memory 32 is displayed by the display unit 28 and the EVF 29 via the D/A converter 19. The display unit 28 and the EVF 29 each perform display in accordance with the analog signal from the D/A converter 19 on a display such as an LCD, an organic EL, or the like. A live view display (LV) can be performed by converting digital signals subjected to A/D conversion by the A/D converter 23 and accumulated in the memory 32 into analog signals with the D/A converter 19, and sequentially transmitting and displaying the analog signals to the display unit 28 or the EVF 29. Hereinafter, an image displayed in a live view display will be referred to as a live view image (LV image).

Various setting values of the camera including a shutter speed and an aperture are displayed on the finder outer display unit 43 via a finder outer display unit driving circuit 44.

A nonvolatile memory 56 is an electrically erasable and recordable memory and is, for example, an EEPROM. Constants, a program, and the like for operations of the system control unit 50 are recorded in the nonvolatile memory 56. In this case, the program refers to a program for executing the various flow charts described later in the present embodiment.

The system control unit 50 is a control unit which is constituted by at least one processor or circuit and which controls the entire digital camera 100. The system control unit 50 realizes the respective processes of the present embodiment (to be described later) by executing a program recorded in the nonvolatile memory 56 described earlier. A system memory 52 is, for example, a RAM, and the system control unit 50 deploys constants and variables for the operations of the system control unit 50, the program read from the nonvolatile memory 56, and the like on the system memory 52. In addition, the system control unit 50 also performs display control by controlling the memory 32, the D/A converter 19, the display unit 28, and the like.

A system timer 53 is a time measuring unit for measuring time used in various control and time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter based on detection results thereof and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communication unit 54 transmits and receives video signals and audio signals to and from an external device connected wirelessly or by a wired cable. The communication unit 54 is also capable of connecting to a wireless LAN (Local Area Network) or the Internet. In addition, the communication unit 54 is also capable of communicating with an external device by Bluetooth (registered trademark) or Bluetooth Low Energy. The communication unit 54 is capable of transmitting images (including LV images) captured by the imaging unit 22 and images recorded on the recording medium 200 and receiving image data and various other types of information from an external device.

An attitude detecting unit 55 detects an attitude of the digital camera 100 relative to a direction of gravitational force. Based on the attitude detected by the attitude detecting unit 55, a determination can be made as to whether an image photographed by the imaging unit 22 is an image photographed while holding the digital camera 100 horizontally or an image photographed while holding the digital camera 100 vertically. The system control unit 50 can add direction information in accordance with the attitude detected by the attitude detecting unit 55 to an image file of the image captured by the imaging unit 22 and record a rotated version of the image. An acceleration sensor, a gyro sensor, or the like can be used as the attitude detecting unit 55. A motion (a pan, a tilt, an uplift, whether stationary or not, and the like) of the digital camera 100 can be detected using the acceleration sensor or the gyro sensor that is the attitude detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display unit 28 and the EVF 29 to display (displayed state) and hide (hidden state) in accordance with the state detected by the eye proximity detecting unit 57. More specifically, at least when a current state is the photography standby state and when a display destination is to be automatically switched, the display unit 28 as the display destination is set to display and the EVF 29 is set to hide when unapproached by the eye. In addition, during an eye approach, the EVF 29 as the display destination is set to display and the display unit 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting portion (not shown) of the eye proximity detecting unit 57 is reflected by the object and received by a light receiving portion (not shown) of the infrared proximity sensor. Based on an amount of received infrared light, how close the object is from the eyepiece 16 (eye proximity distance) can be determined. In this manner, the eye proximity detecting unit 57 performs eye proximity detection in which a distance of approach of an object with respect to the eyepiece 16 is detected. An eye approach is to be detected when an object having approached the eyepiece 16 to within a prescribed distance from an eye-unapproached state (unapproached state) is detected. An eye separation is to be detected when an object of which an approach has been detected recedes to a prescribed distance or more from an eye-approached state (approached state). A threshold for detecting an eye approach and a threshold for detecting an eye separation may differ from each other by, for example, setting a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as an approach by an eye or an object which can be regarded as an eye approach can be detected.

An operating unit 70 is an input unit for accepting an operation (a user operation) by the user and is used to input various operation instructions to the system control unit 50. As shown in FIG. 2, the operating unit 70 includes the mode changeover switch 60, the shutter button 61, the power switch 72, the touch panel 70*a*, and the touch bar 82. As other operation members 70*b*, the operating unit 70 also includes the main electronic dial 71, the sub electronic dial 73, the four-way key 74, the SET button 75, the moving image button 76, the AE lock button 77, the enlargement button 78, the playback button 79, and the menu button 81.

The mode changeover switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode changeover switch 60, the user can directly switch to any of these modes. Alternatively, after temporarily switching to a list screen of the photography mode using the mode changeover switch 60, another operation member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of an AF (automatic focusing) process, an AE (automatic exposure) process, an AWB (automatic white balance) process, an EF (preliminary light emission before flash) process, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the imaging unit 22 to writing a captured image into the recording medium 200 as an image file.

The touch panel 70*a* and the display unit 28 can be integrally configured. For example, the touch panel 70*a* is configured such that transmittance of light does not obstruct display by the display unit 28 and is mounted to an upper layer of a display surface of the display unit 28. Subsequently, an input coordinate on the touch panel 70*a* and a display coordinate on the display surface of the display unit 28 are associated with each other. Accordingly, a GUI (graphical user interface) can be provided which enables the user to feel as if a screen displayed on the display unit 28 can be directly manipulated. The system control unit 50 is capable of detecting the following operations to the touch panel 70*a* or the following states of the touch panel 70*a*.

A new touch on the touch panel 70*a* by a finger or a stylus previously not in touch with the touch panel 70*a* or, in other words, a start of a touch (hereinafter, referred to as a touch-down)

A state where the touch panel 70*a* is being touched by a finger or a stylus (hereinafter, referred to as a touch-on)

A finger or a stylus moving while in touch with the touch panel 70*a* (hereinafter, referred to as a touch-move)

A separation (release) from the touch panel 70*a* by a finger or a stylus previously in touch with the touch panel 70*a* or, in other words, an end of a touch (hereinafter, referred to as a touch-up)

A state where nothing is touching the touch panel 70*a* (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger or a stylus touches the touch panel 70*a* through an internal bus. In addition, based on the notified information, the system control unit 50 determines what kind of operation (touch operation) has been performed on the touch panel 70*a*. With respect to a touch-move, a movement direction of a finger or a stylus moving on the touch panel 70*a* can also be determined for each of a vertical component and a horizontal component on the touch panel 70*a* based on a change in the position coordinate. When a touch-move of a prescribed distance or more is detected, it is determined that a slide operation has been performed. An operation involving quickly moving a finger on the touch panel 70*a* for a certain distance while keeping the finger in touch with the touch panel 70*a* and then releasing the finger is referred to as a flick. In other words, a flick is an operation in which a finger quickly traces the surface of the touch panel 70*a* as though flicking at the touch panel 70*a*. A determination that a flick has been performed can be made (a determination that a flick has occurred following a slide operation can be made) when a detection of a touch-move of a prescribed distance or more at a prescribed speed or more is followed by a detection of a touch-up. Furthermore, a touch operation involving touching (multi-touching) a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). The touch panel 70*a* may adopt any touch panel system among various systems including a resistive film system, a capacitance system, a surface acoustic wave system, an infrared system, an electromagnetic induction system, an image recognition system, and an optical sensor system. Any of a system in which a touch is detected when contact is made with the touch panel and a system in which a touch is detected when a finger or a stylus approaches the touch panel may be adopted.

In addition, the system control unit 50 is capable of detecting the following operations to the touch bar 82 or the following states of the touch bar 82.

A new touch on the touch bar 82 by a finger previously not in touch with the touch bar 82 or, in other words, a start of a touch (hereinafter, referred to as a touch-down)

A state where the touch bar 82 is being touched by a finger (hereinafter, referred to as a touch-on)

A finger moving while in touch with the touch bar 82 (hereinafter, referred to as a touch-move)

A separation (release) from the touch bar 82 by a finger previously in touch with the touch bar 82 or, in other words, an end of a touch (hereinafter, referred to as a touch-up)

A state where nothing is touching the touch bar 82 (hereinafter, referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger touches the touch bar 82 through an internal bus and, based on the notified information, the system control unit 50 determines what kind of operation (touch operation) has been performed on the touch bar 82. With respect to a touch-move, a movement in a horizontal direction (left-right direction) on the touch bar 82 is detected. When a movement of a touch position by a prescribed distance or more (a movement of a prescribed amount or more) is detected, it is determined that a slide operation has been performed. A determination that a tap operation has been performed is to be made when an operation is performed in which the touch bar 82 is touched by a finger and the touch is released within a prescribed period of time without performing a slide operation. In the present embodiment, the touch bar 82 is assumed to be a capacitance-system touch sensor. Alternatively, touch sensors of other systems including a resistive film system, a surface acoustic wave system, an infrared system, an electromagnetic induction system, an image recognition system, and an optical sensor system may be used as the touch bar 82.

Three touch sensor electrodes are arranged inside the touch bar 82. The system control unit 50 is capable of reading voltage (a voltage output value) of each of the three touch sensor electrodes. In addition, for each of the three touch sensor electrodes, the system control unit 50 can detect a voltage variation amount which is a variation amount of voltage from a base voltage (a reference value adjusted or calibrated in accordance with the environment). The system control unit 50 calculates a weighted average of the voltage variation amount (a variation amount of capacitance) detected for each of the three touch sensor electrodes and acquires a signal (a touch coordinate) which indicates a touch position in the X axis direction (a transverse direction) in 256 scales of 0 to 255. 0 represents a leftmost (on the side of the finder 17) position and 255 represents a rightmost (on the side of the thumb rest portion 91) position. Moreover, the number of electrodes is not limited to three. Furthermore, a touch coordinate is not limited to a 256-scale value.

Functions corresponding to an operating position and an operating method can be allocated to the touch bar 82. Functions can be individually allocated to a left tap toward the left side and a right tap toward the right side of a touch detection surface (a key top) of the touch bar 82. A left tap is a tap operation toward a left-side portion which is a partial region closer to the left side than the center rather than the entire portion of the touch detection surface (the key top) of the touch bar 82. A right tap is a tap operation toward a right-side portion which is a partial region closer to the right side than the center of the touch detection surface (the key top) of the touch bar 82. Moreover, other functions different from those of the left tap and the right tap can be allocated to slide operations toward the left and right sides acceptable in the entire key top including the left-side portion and the right-side portion of the touch bar 82. That is, different functions can be registered for respective operating positions and operating methods (for respective operation types) of the touch bar 82. The left tap and the right tap can be identified such that a tap of which the touch coordinate is 128 or smaller (closer to the left side than the center) is identified as a left tap and a tap of which the touch coordinate is 129 or more (closer to the right side than the center) is identified as a right tap. A tap toward the center may be identified as neither a left tap or a right tap and may be identified such that a tap of which the touch coordinate is 100 or smaller is identified as a left tap and a tap of which the touch coordinate is 155 or more is identified as a right tap. The touch bar 82 is disposed at a position at which a user can perform a right tap, a left tap, and a slide operation with the thumb of the hand holding the grip portion 90 in a state in which user's eye is close to the user has his or her eye accessing the finder 17.

A white balance (WB) setting which is one of photographing setting items is a setting item used for adjusting the tone of a captured image according to a photographing environment, a subject, and the like. Specifically, white balance setting is performed by selecting items (options) such as "auto", "daylight", "shade", "cloudy", "tungsten", "fluorescent", "strobe", "manual", and "color temperature". Hereinafter, the above-mentioned items will be referred to as setting values of white balance. The setting values of white balance are not limited thereto and various setting values may be provided depending on a photographing environment or the like. When photographing is performed according to the signal SW2, an image before developing is captured, and the image processing unit 24 performs color processing (one of developing processing steps) on the captured image using an image processing parameter based on a set white balance. The processed image is recorded on the recording medium 200 (when it is not set such that a raw image only is to be recorded).

In the present embodiment, when a setting value of the white balance is "auto" (auto white balance or AWB), a detailed item corresponding to a preferential tone can be set. Specifically, "ambience priority (of auto)" (in other words "atmosphere preferential (of auto)") and "white priority (of auto)" (in other words "white preferential (of auto)") can be selected as detailed items of auto. Hereinafter, the detailed items will be referred to as detailed values of auto. When a subject is photographed under an incandescent lamp, for example, with the detailed value of auto set to "ambience priority", it is possible to obtain a picture with a slightly red tone, stressing the ambience of the scene. When the detailed value of auto is set to "white priority", it is possible to obtain a picture with a little red tone as compared to that of "ambience priority". That is, the tone of a photographed picture changes depending on the detailed value of auto. The detailed value of auto is not limited to the above-mentioned examples, other detailed items may be used and three or more detailed items may be provided.

In the following description, it is assumed that a function of changing the setting value of white balance to "cloudy" is allocated to a left tap operation of the touch bar 82. Moreover, it is assumed that a function (an auto type changing function) of changing the detailed value of auto of white balance is allocated to a right tap operation of the touch bar 82. Furthermore, a function (a function of sequentially changing the setting value of WB according to a slide) of changing the setting value of white balance to a previous or next setting value depending on the direction of a slide is allocated to a slide operation of the touch bar 82.

A process of allocating a function to the touch bar 82 will be described later with reference to FIGS. 7A to 7E.

Figure 3:
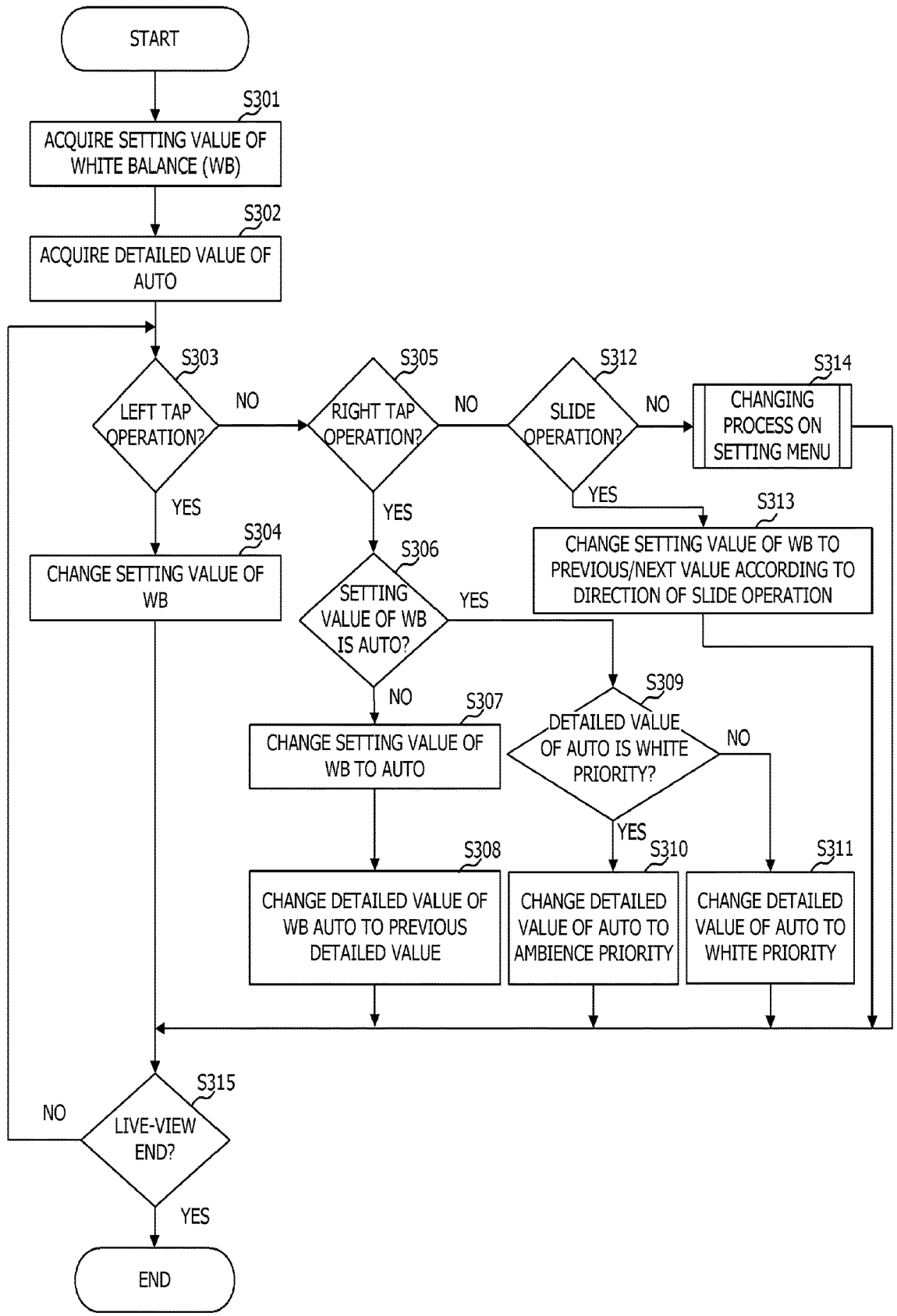
FIG. 3 is a flowchart illustrating an example of a setting process according to the present embodiment.

FIG. 3 is a flowchart illustrating a white balance setting process in the digital camera 100 according to the present embodiment. This process is realized by the system control unit 50 loading a program stored in the non-volatile memory 56 into the system memory 52 and executing the program. The process of FIG. 3 is a flowchart that describes a white balance setting operation in detail and other elements are omitted. As described above, a photographing preparation process when the signal SW1 is issued on a photographing standby screen, a main photographing process when the signal SW2 is issued, and other processes are omitted in FIG. 3, but these processes are performed in parallel. Moreover, the setting contents of white balance set by the process described in the flowchart to be described later are applied to displaying of a live-view image and image processing of still images and video obtained by the main photographing. When the digital camera 100 is activated in a photographing mode, the process of FIG. 3 starts.

Figure 4A:
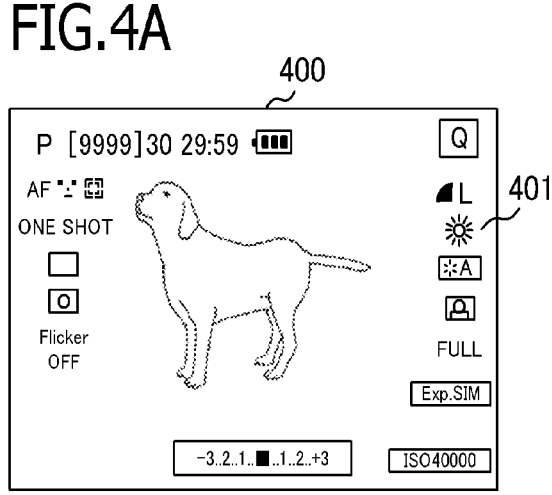
FIGS. 4A to 4D are diagrams illustrating examples of screen display according to the present embodiment.

In step S301, the system control unit 50 acquires the setting value of white balance stored in the non-volatile memory 56 into the system memory 52. Moreover, the system control unit 50 displays the acquired present setting value (setting content) of white balance on the photographing standby screen. FIG. 4A illustrates a display example of the photographing standby screen that displays the present setting value of white balance. It is assumed that the display examples illustrated in FIGS. 4A to 4D, FIGS. 6A to 6E to be described later, and FIGS. 7A to 7E to be described later are displayed on the display unit 28 when user's eye is not close to the finder 17 and are displayed on the EVF 29 when the eye is close to the finder 17. In FIG. 4A, the setting state of various photographing settings are displayed on a photographing standby screen 400 so as to be superimposed on a live-view image captured by the imaging unit 22. An icon 401 indicates that the present setting value of white balance is set to "daylight".

In step S302, the system control unit 50 acquires the detailed value of auto when the setting value of white balance is set to "auto", recorded on the non-volatile memory 56 into the system memory 52. This detailed value is a detailed value (a type of auto) set when the setting value of white balance was previously set to "auto". When the present setting value of white balance acquired in the process of step S301 is "auto", the display indicating the acquired detailed value is performed. When the present setting value is not "auto", the display indicating the value acquired in step S302 is not performed particularly.

In step S303, the system control unit 50 determines whether a left tap operation is performed. The flow proceeds to step S304 when a left tap operation is performed, and otherwise, the flow proceeds to step S305.

Figure 4B:
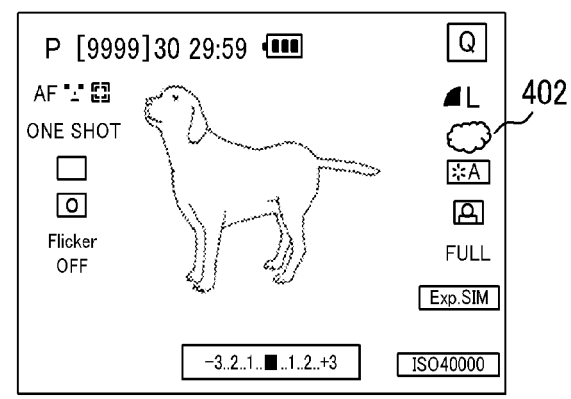

In step S304, the system control unit 50 changes the setting value of white balance to a setting value of white balance allocated to the left tap operation. In the present embodiment, as described above, since a function of setting the setting value of white balance to "cloudy" is allocated to the left tap operation, the setting value of white balance is changed to "cloudy" regardless of the setting value of white balance before changing the setting. For example, as illustrated in FIG. 4A, when a left tap operation is performed in a state in which "daylight" is set, the setting value of white balance is changed to "cloudy", and an icon 402 indicating that white balance is set to "cloudy" is displayed as illustrated in FIG. 4B. When the setting value of white balance is changed, an icon indicating the setting value of white balance after change displayed on the photographing standby screen may be displayed in a highlighted manner. Highlighting is, for example, changing the color or the size from that before change, and displaying the icon in a blinking manner. When the setting value is set to "cloudy" before a left tap operation is performed, the setting of white balance is not changed and "cloudy" is maintained.

In step S305, the system control unit 50 determines whether a right tap operation is performed. The flow proceeds to step S306 when a right tap operation is performed, and otherwise, the flow proceeds to step S312.

In step S306, the system control unit 50 determines whether the present setting value is "auto" by referring to the present setting value of white balance maintained in the system memory 52. The flow proceeds to step S309 when the setting value is set to "auto", and otherwise, the flow proceeds to step S307.

In step S307, the system control unit 50 changes the setting value of white balance from other setting value ("daylight", "cloudy", or the like) to "auto". The setting value after change is stored in the system memory 52 and the non-volatile memory 56.

Figure 4C:
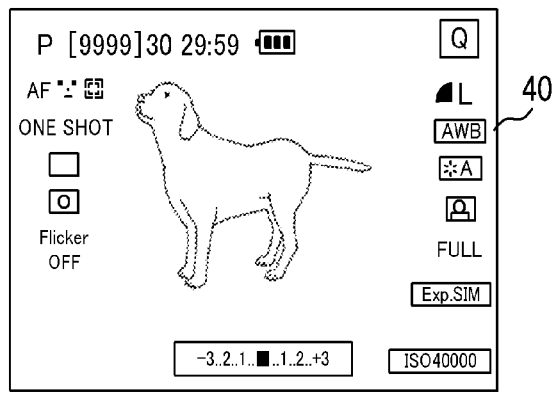

In step S308, the system control unit 50 changes (updates) the detailed value of auto to a detailed value of auto set when "auto" was set previously, maintained in the system memory 52. For example, when "ambience priority" is set in a state in which "auto" is set previously, and a right tap is performed in a state in which the detailed value is changed to "daylight" or "cloudy", the detailed value is set to "ambience priority" of auto. Moreover, when "white priority" is set in a state in which "auto" is set previously, and a right tap is performed in a state in which the detailed value is changed to "daylight" or "cloudy", the detailed value is set to "white priority" of auto. FIG. 4C illustrates a display example of a photographing standby screen in a state in which the white balance is set to "ambience priority" of "auto". In FIG. 4C, an icon 403 indicating that "ambience priority" of "auto" is set is displayed. When "ambience priority" is set in a state in which "auto" is set previously, and a right tap is performed in a state illustrated in FIG. 4A or 4B in which the detailed value is changed to "daylight" or "cloudy", the state illustrated in FIG. 4C is created.

When it is determined in step S306 that the original setting value of white balance was "auto", the detailed value of auto is changed according to a right tap. That is, in step S309, the system control unit 50 determines whether the detailed value of auto set when "auto" was set previously, maintained in the system memory 52 is "white priority". The flow proceeds to step S310 when the detailed value is "white priority", and otherwise, the flow proceeds to step S311.

In step S310, the system control unit 50 changes the detailed value of auto from "white priority" to "ambience priority". The detailed value of auto after change is stored in the system memory 52 and the non-volatile memory 56.

In step S311, the system control unit 50 changes the detailed value of auto from "ambience priority" to "white priority". The system control unit 50 stores the detailed value of auto after change in the system memory 52 and the non-volatile memory 56.

Figure 4D:
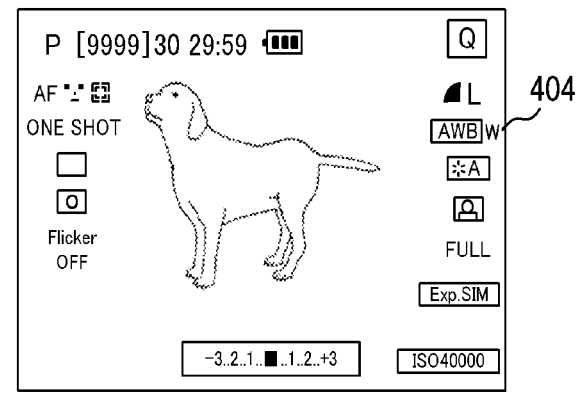

According to the processes described in steps S309 to S311, when a right tap is performed in the state illustrated in FIG. 4C, the setting content of white balance is changed from "ambience priority" of "auto" to "white priority" of "auto" and the state illustrated in FIG. 4D is created. When a right tap is performed in the state illustrated in FIG. 4C, the setting content of white balance is changed from "white priority" of "auto" to "ambience priority" of "auto" and the state illustrated in FIG. 4D is created. That is, once white balance is switched to "auto", when a right tap is performed, the type (the detailed value) of AWB is switched and the state of FIG. 4C and the state of FIG. 4D are alternately switched. FIG. 4D is a display example of the photographing standby screen in a state in which white balance is set to "white priority" of "auto". In FIG. 4D, an icon 404 indicating that "white priority" of "auto" is set is displayed. When "white priority" is set in a state in which "auto" is set previously, and a right tap is performed in a state illustrated in FIG. 4A or FIG. 4B in which the detailed value is changed to "daylight" or "cloudy", the state illustrated in FIG. 4D is created.

In step S312, the system control unit 50 determines whether a slide operation is performed on the touch bar 82. The flow proceeds to step S313 when it is determined that a slide operation is performed, and otherwise, the flow proceeds to S314.

In step S313, the system control unit 50 changes the setting value of white balance from the present setting to a previous or next setting value in a predetermined order according to the direction of the slide operation. The predetermined order may be an ascending order of "auto", "daylight", "shade", "cloudy", "tungsten", and the like and may be a descending order which is reverse to the ascending order. For example, when the setting value before change is "daylight" (FIG. 4A) and a slide operation from left to right is performed, the setting value is switched to "auto" (see FIG. 4C or 4D). The detailed value set in this case is the detailed value of auto set when "auto" was set previously. It is not possible to change the detailed value of "auto" with a slide. When the setting value before change is "auto" (see FIG. 4C or 4D) and a slide operation toward the right side is performed, the setting value is switched to "daylight" (FIG. 4A).

In step S314, the system control unit 50 performs a changing process on a setting menu. This process will be described later with reference to FIG. 5.

In step S315, the system control unit 50 determines whether an instruction to end live-view display is issued. When an operation such as power off or transition to another operation mode such as a play mode is performed, it is determined that an instruction to end live-view display is issued, and the process of FIG. 3 ends, and otherwise, the flow returns to step S303 and the process is repeated.

According to the process described in FIG. 3, even when a setting menu is not open by a right tap on the touch bar 82, it is possible to immediately change the setting value of white balance to the detailed value (AWB of the type used previously) used previously among other setting values of auto. Moreover, even when a setting menu is not open by a left tap on the touch bar 82, it is possible to immediately change the setting value of white balance to a registered specific setting value ("cloudy" in the above-described example). Moreover, even when a setting menu is not open by a slide on the touch bar 82, it is possible to immediately change the setting value of white balance to the next or previous setting value. Therefore, it is possible to quickly change the setting values of auto and other setting values according to a subject and to perform photographing. Furthermore, once white balance is switched to auto, it is possible to immediately switch the type of AWB even when a setting menu is not open by a right tap on the touch bar 82. Therefore, it is possible to quickly change the type (the detailed value) of AWB according to a subject and to perform photographing. Particularly, since these switching operations can be performed by an operation on the touch bar 82, it is possible to quickly change the setting value of white balance in a state in which a user holds the digital camera 100 with the eye being close to the finder 17 and to change to an appropriate setting and perform photographing without missing a shutter chance.

Next, FIG. 5 illustrates a detailed flowchart of a changing process on the setting menu described in step S314 of FIG. 3. This process is realized by the system control unit 50 loading a program stored in the non-volatile memory 56 into the system memory 52 and executing the program.

Figure 6A:
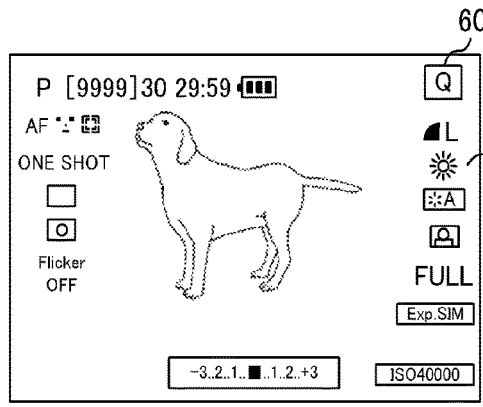
FIGS. 6A to 6E are diagrams illustrating examples of screen display according to the present embodiment.

In step S500, the system control unit 50 determines whether a quick setting menu display instruction is issued. The quick setting menu display instruction can be issued when a user presses the SET button 75 or touches an icon 601 illustrated in FIG. 6A. FIG. 6A is the same photographing standby screen as FIG. 4A. The flow proceeds to step S502 when it is determined that the quick setting menu display instruction is issued, and otherwise, the process of FIG. 5 ends.

Figure 6B:
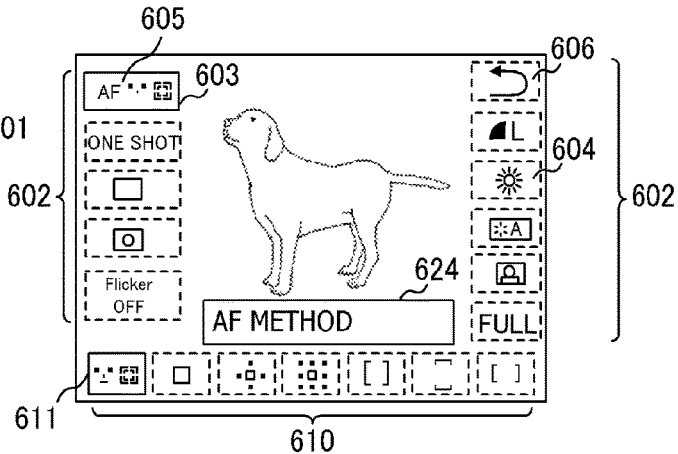

In step S501, the system control unit 50 displays a quick setting menu. FIG. 6B illustrates a display example of a quick setting menu. The quick setting menu includes a first layer menu item group 602 and a second layer menu item group 610, and these menu item groups are displayed so as to be superimposed on a live-view image. A cursor 603 is a selecting cursor for selecting at least one item within the first layer menu item group 602. The cursor 603 can be moved by operating up-down keys of the four-direction key 74 or an operation of touching any one item within the first layer menu item group 602. The first layer menu item group includes an icon 605 which is an AF method setting item, an icon 604 which is a white balance setting item, and an icon 606 for exiting the quick setting menu as a non-display state. The respective icons included in the first layer menu item group 602 indicate the present setting value of the setting items indicated by the respective icons, the icon 605 indicates "face tracking preferential AF", and the icon 604 indicates "daylight". The example of FIG. 6B illustrates a state in which the icon 605 which is an AF method item within the first layer menu item group 602. The second layer menu item group 610 is a sub-menu of the item selected within the first layer menu item group and is a candidate group of the setting value that can be set for the setting item selected within the first layer menu item group. In the example of FIG. 6B, the second layer menu item group 610 is the candidates for the setting value that can be set as an AF method, and an item for setting "face tracking preferential AF" among the candidates is selected. A cursor 611 is a selecting cursor for selecting any one item within the second layer menu item group 610. The cursor 611 can be moved by operating left-right keys of the four-direction key 74, rotating the main electronic dial 71, rotating the sub-electronic dial 73, or an operation of touching any one item within the second layer menu item group 610. When the cursor 611 is moved, the setting is changed to a setting value indicated by a movement destination item, and a display form of an icon of a corresponding parent item within the first layer menu item group 602 is changed. For example, when the cursor 611 is moved to an item (the second item from the left in FIG. 6B) indicating "one-point AF" within the second layer menu item group 610, a display form of the icon 605 indicating the setting item of AF method which is a corresponding parent item is also changed to a display form indicating "one-point AF".

In step S502, the system control unit 50 determines whether the cursor 603 for selecting any one within the first layer menu item group 602 has moved to the icon 604 which is the item of white balance. The flow proceeds to step S505 when the cursor 603 has moved to the icon 604 which is the item of white balance, and otherwise, the flow proceeds to step S503.

In step S503, the system control unit 50 determines whether an operation of moving the cursor 603 is performed. In the present embodiment, the cursor 603 can be moved to another setting item by operating the four-direction key 74 up and down or touching an icon indicating the setting item illustrated in FIG. 6B. When an operation of moving the cursor 603 is performed, the cursor 603 is moved according to the operation, a sub-menu (the second layer menu item group) corresponding to the movement destination item is displayed, and the flow proceeds to step S502, and otherwise, the flow proceeds to step S504.

Figure 6C:
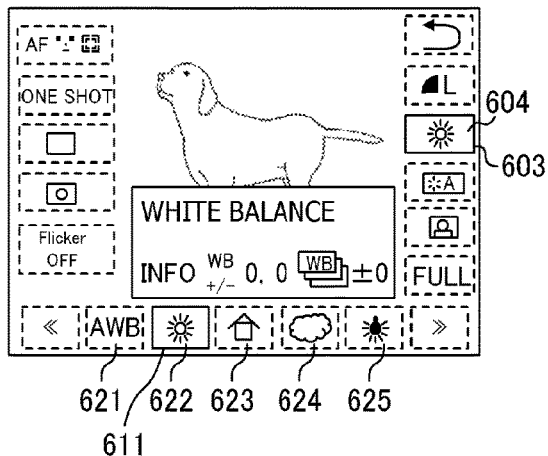

In step S503, when the cursor 603 is moved to the icon 604 which is the item of white balance, a list of candidates for the setting value of white balance is displayed as the second layer menu item group (sub-menu). FIG. 6C illustrates an example in which the icon 604 is selected by the cursor 603 and a list of candidates for the setting value of white balance is displayed as the second layer menu item group (sub-menu). Icons 621 to 625 indicate "auto", "daylight", "shade", "cloudy", and "tungsten", and any one of the setting values can be selected by the cursor 611. In FIG. 6C, "daylight" is selected. Since the setting of the detailed value of auto to be described later is effective when the white balance is set to "auto" only, a guide 630 to be described later is not displayed on a display screen illustrated in FIG. 6C (since the setting value of white balance is "daylight"). Furthermore, other setting value candidates can be switched by selecting the right-side icon or the left-side icon of the icons 621 to 625 or performing an operation of selecting the left end or the right end of the displayed icons 621 to 625 and selecting the direction closer to the end. Furthermore, the setting value candidates (options) displayed include "fluorescent (daylight white)", "fluorescent (daylight blue)", "strobe", "manual", "color temperature", "underwater", and the like. When a determination result of Yes is obtained in step S502, a list of setting value candidates for white balance is displayed as the second layer menu item group (sub-menu) similarly to FIG. 6C.

In step S504, the system control unit 50 determines whether the display of the quick setting menu will be ended. In the present embodiment, the display of the quick setting menu ends when the SET display 75 is pressed during the display of the quick setting menu, a predetermined period has elapsed in a non-operation state, and the icon 606 is touched. When the display of the quick setting menu ends, the process of FIG. 5 ends by exiting the quick setting menu as a non-display state, and the photographing standby screen is displayed. The flow returns to step S502 when the display of the quick setting menu is not ended.

In step S505, the system control unit 50 determines whether an instruction to change the setting value of white balance is issued. The white balance setting value can be changed by selecting the icon 604 which is an item of white balance within the first layer menu item group 602 and changing the item to be selected by the cursor 611 within the displayed sub-menu (the second layer menu item group). The cursor 611 can be moved by operating the left-right keys of the four-direction key 74, rotating the main electronic dial 71, rotating the sub-electronic dial 73, or touching any one of the second layer menu item group 610 as described above. The flow proceeds to step S506 when the setting value is changed (the cursor 611 is moved), and otherwise, the flow proceeds to step S507.

Figure 6D:
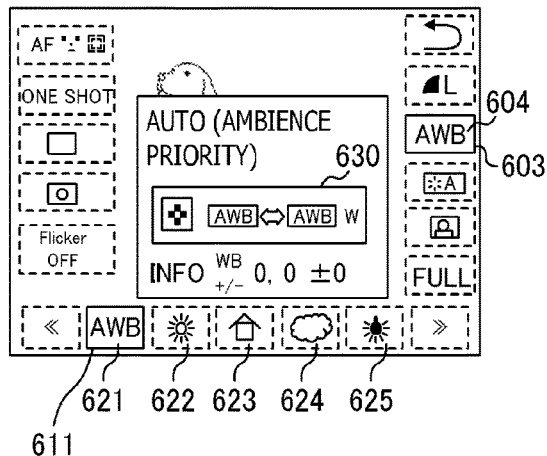

In step S506, the system control unit 50 changes the setting value of white balance to the setting value selected by the cursor 611 after movement. The setting value after change is stored in the system memory 52 and the non-volatile memory 56. In this case, when "auto" (the icon 621) is selected, the detailed value (AWB of the type used previously) used previously within auto is set. Moreover, a guidance for switching the detailed value (the type of AWB) of auto is displayed. FIG. 6D illustrates an example in which the icon 621 is selected by the cursor 611 and a guidance for switching the detailed value (the type of AWB) of auto is displayed. In the illustrated example, the detailed value (the type of AWB) of auto is set to "ambience priority". Due to this, a display form in which the icon 604 which is a parent item indicates "ambience priority" of "auto" is created. Moreover, the guide 630 indicating that a user may press an enlarge button 78 to switch the detailed value of "auto" is displayed. The detailed value is not switched immediately even when the enlarge button 78 is pressed. Instead of this, a detailed value switching screen is displayed, and the detailed value is switched by a subsequent switching operation. The detailed value switching screen may be displayed by touching a display region of the guide 630.

In step S507, the system control unit 50 determines whether the setting value of white balance is set to "auto". The flow proceeds to step S508 when the setting value is set to "auto", and otherwise, the flow proceeds to step S504.

In step S508, the system control unit 50 determines whether an operation for switching to a screen for setting the detailed value of auto of white balance is performed. Specifically, it is determined whether the enlarge button 78 is pressed or the region of the guide 630 is touched in the state illustrated in FIG. 6D. The flow proceeds to step S509 when the enlarge button 78 is pressed or the region of the guide 630 is touched, and otherwise, the flow proceeds to step S504.

Figure 6E:
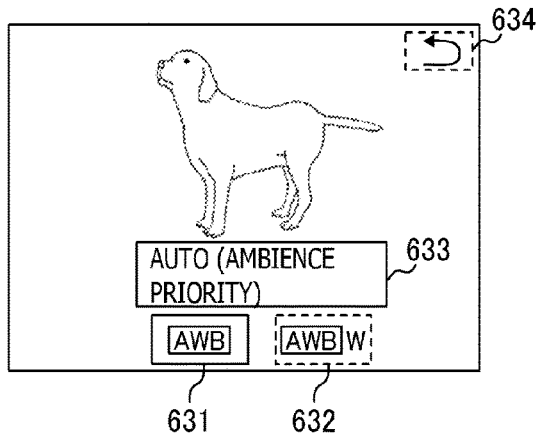

In step S509, the system control unit 50 displays a detailed value setting screen for auto. FIG. 6E illustrates a display example of the detailed value setting screen for auto. An icon 631 for setting "ambience priority" and an icon 632 for setting "white priority", which are options of the detailed value of auto are displayed so as to be superimposed to a live-view image. It is possible to select any one of the icons 631 and 632 by the same operation as the operation of selecting any one item within the second layer menu item group. A guide 633 indicates a detailed value selected (set) presently. An icon 634 is a touch icon for exiting the detailed value setting screen for auto and returning to the quick setting menu.

In step S510, the system control unit 50 determines whether an operation of changing the detailed value of auto (an operation of selecting any one of the icons 631 and 632) is performed. The flow proceeds to step S511 when the main electronic dial 71 or the sub-electronic dial 73 are turned, the four-direction key 74 is operated in a left-right direction, or an operation of touching any one of the icons 631 and 632 is performed, and otherwise, the flow proceeds to step S512.

In step S511, the system control unit 50 changes the detailed value of auto to a detailed value corresponding to an icon selected among the icons 631 and 632. The detailed value after change is stored in the system memory 52 and the non-volatile memory 56.

In step S512, the system control unit 50 determines whether the setting of the detailed value of auto is ended. The setting of the detailed value of auto ends when the SET button 75 is pressed or the icon 634 illustrated in FIG. 6E is touched. When the setting of the detailed value of auto ends, the quick setting menu screen is displayed and the flow proceeds to step S504, and otherwise, the flow returns to step S510.

As described above, when the detailed value of auto is changed in the order described using FIG. 5 and FIGS. 6A to 6E, it is necessary to perform the following operations. That is, it is necessary to perform another operation (pressing the enlarge button 78 or touching the guide 630) and display a detailed value setting screen in order to switch to "auto" after the setting value of white balance is changed to "auto" using the quick setting menu screen. Furthermore, it is necessary to perform an operation of changing the detailed value of auto. On the other hand, in the present embodiment, as illustrated in FIGS. 4A to 4D and FIG. 5, it is possible to change the setting value of white balance to "auto" with a right tap operation to which a function of changing the detailed value of auto is allocated and to change the detailed value of auto by continuing the same operation. Therefore, in the method of switching white balance with a right tap described above, it is possible to set "auto" of white balance and change the detailed value (type) more quickly than switching the white balance using the quick setting menu.

Screen of Allocating Function to Touch Bar According to Present Embodiment

Next, a method of allocating functions to the touch bar 82 in the present embodiment will be described. A screen 700 illustrated in FIG. 7A is a setting screen for allocating functions to the touch bar 82. A button 701 illustrated in FIG. 7A indicates a function group set presently. In the present embodiment, when functions are allocated to the touch bar 82, a recommended function combination is prepared as several function groups. For example, when ISO sensitivity is set as a function group, a function of increasing or decreasing the ISO sensitivity according to a slide direction is allocated to a slide operation of the touch bar 82, a function of decreasing the ISO sensitivity by one level is allocated to a left tap operation, and a function of increasing the ISO sensitivity by one level is allocated to a right tap operation. By setting the function group in this manner, it is possible to appropriately allocate a plurality of operations for one setting item to the touch bar 82 and to perform operations on one setting item with satisfactory operability on the basis of an appropriate combination of operations. Although icons 702 to 704 display functions allocated to a slide operation, a left tap operation, and a right tap operation, "OFF" is displayed on a screen 700 illustrated in FIG. 7A since no function is allocated. When a button 701 illustrated in FIG. 7A is selected, a screen 705 illustrated in FIG. 7B is displayed.

A screen 705 illustrated in FIG. 7B is a screen for selecting a function group. The function groups indicated by icons 706 to 708 are a plurality of groups obtained by classifying a plurality of allocatable functions. The icon 706 indicates a function group related to ISO sensitivity, the icon 707 indicates a function group related to white balance, and the icon 708 indicates a function group related to focusing and information display. A user selects a function that is to be allocated to the touch bar 82 among the plurality of function groups.

FIG. 7C illustrates a screen when the function group of white balance is selected in FIG. 7B. A button 701 indicates that the function group is white balance. An icon 702 indicates that a function of changing white balance is allocated to a slide operation. Similarly, an icon 703 indicates that a function of changing the setting value of white balance to a previous value in a predetermined order is allocated to a left tap operation, and an icon 704 indicates that a function of changing the setting value of white balance to the next value is allocated to a right tap operation. When the icon 703 is selected, a screen 723 illustrated in FIG. 7D is displayed and individual functions can be set to the left tap operation. Although not illustrated in the drawings, even when icons 702 and 704 are selected, a screen similar to the screen illustrated in FIG. 7D is displayed, and individual functions can be set to the respective operations. When the function group is selected as described above, functions are set to respective operation types automatically. After that, a user can change functions allocated to respective operation types and allocate arbitrary functions among the functions included in the set function group.

In FIG. 7D, an icon 716 indicates a function of changing the setting value of white balance to a previous value. An icon 717 indicates a function of switching between "white priority" and "ambience priority" which are detailed values of auto of white balance. An icon 718 indicates a function of selecting a specific setting value ("daylight" in the illustrated example) of white balance. By pressing an INFO button included in the operating unit 70 in a state in which the icon 718 is selected, it is possible to change the specific setting value as a function allocated to the operation type selected by the selection of the icon 718 to other setting values such as "shade" or "cloudy". An icon 719 indicates a function of switching to a white balance shift screen. An icon 720 indicates that no function is allocated. Any one of a plurality of functions illustrated in the items 716 to 720 included in the selected function group, excluding functions which are not included in the selected function group (white balance in the example of FIG. 7D) can be allocated to each of a plurality of operation types such as a tap and a slide. When any one of the functions is selected, a screen illustrated in FIG. 7E is displayed.

FIG. 7E is a display example when a function of sequentially switching the setting values of WB is allocated to a slide operation, a function of changing the setting value of white balance is allocated to a left tap operation, and a function of switching the detailed values of auto of white balance is allocated to a right tap operation. This is an example of the allocation state used in the description of FIG. 3.

According to the above-described embodiment, it is possible to change the setting value of white balance with a simple operation on a touch bar. Moreover, when the setting value of white balance is set to "auto", the detailed value of auto can be changed with a simple operation on a touch bar. In this way, it is possible to change the setting of white balance quickly.

When white balance is not changed by a tap operation according to the present embodiment, it is necessary to perform a plurality of operations on a setting screen displayed as a quick setting menu as described above. For example, when a user changes the setting to "auto" in a state in which the setting value of white balance is not "auto" and changes the detailed value further, the user needs to perform the following operations. That is, the user needs to perform an operation for changing the setting value to "auto" on a setting screen and an operation of opening a screen for changing the detailed value of auto and perform a changing operation on the screen. However, when operations are performed in such a plurality of orders, it is not possible to change the setting quickly. Therefore, as described above, by allocating a function of changing the setting value of white balance to "auto" and changing the detailed value of auto to a tap operation, the number of operations for changing the setting of white balance is decreased.

According to the above-described embodiment, in a state in which an item of white balance is selected on a quick setting menu, it is possible to select and set any one item within the second layer menu item group which is a plurality of options respectively corresponding to a plurality of settings including at least auto, daylight, and fluorescent. An operation of selecting any one item within the second layer menu item group for white balance is performed by the left and right keys of the direction key 74, the main electronic dial 71, the sub-electronic dial 73, and the touch panel 70*a*. Moreover, in the photographing standby screen, when the white balance is set to "auto", the white balance setting can be changed to one of a plurality of types of settings ("ambience priority" and "white priority") corresponding to "auto" according to a right tap on the touch bar 82. A case in which the white balance is set to "auto" is a case in which the white balance setting is a setting corresponding to an option (the icon 621) of "auto" within the second layer menu item group. Moreover, when the white balance is set to "auto", the white balance setting is changed to another type of setting among a plurality of types of settings ("ambience priority" and "white priority") of "auto" according to a right tap on the touch bar 82. Moreover, when a plurality of options respectively corresponding to the plurality of types of settings ("ambience priority" and "white priority") of "auto" is not included in the second layer menu item group for white balance and the type is to be changed from this menu screen, it is necessary to open a detailed value changing screen.

While preferred embodiments of the present invention have been described, the present invention is not limited to these embodiments and various modifications and changes can be made within the spirit of the present invention.

In the above-described embodiment, although the control of tap and slide operations of the touch bar mounted on a digital camera has been described, the control can be applied to an operating unit such as a touch panel or a touch pad mounted on various electronic apparatuses. In this case, the functions allocated to the left tap operation or the right tap operation in the above-described embodiment may be allocated to respective buttons or the like. Moreover, a plurality of functions may be allocated to a plurality of members. For example, a function of switching to a specific WB setting value and a function of sequentially switching the setting values of WB may be allocated to pressing of the up button and the down button of the four-direction key 74 and rotating of the main electronic dial 71 during the display of the photographing standby screen. The above-described process can be applied to such allocation of operations.

In the above description, an example of switching from other setting value to auto and changing the type within auto according to a specific operation (a right tap in the above description) to which a function of switching the type of auto is allocated has been described. However, the present invention is not limited to auto but can be applied if a plurality of detailed values can be set and changed for one setting value. For example, the setting value of white balance include a setting value of "fluorescent", and the sub-set of "fluorescent" includes detailed values (types) for each color such as "daylight white", "daylight blue", "white", and "warm white". Such an operational feeling as described for "auto" can be applied to "fluorescent". That is, when a specific operation (a right tap) is performed in a state in which other setting value ("daylight" or the like) is set, the setting value is switched to a detailed value when the white balance was set to "fluorescent" among the detailed values of "fluorescent". When a specific operation (a right tap) is performed further in that state, a plurality of types of settings included in "fluorescent" are sequentially switched. In this case, "fluorescent" has only one option selectable as the second layer menu item group, and when a user wants to change the type (a detailed value), the user can change the type by opening a detailed value changing screen similarly to "auto".

The present invention can be grasped as an imaging control apparatus including an operating unit and a control unit. Here, the operating unit selects any one of a plurality of setting values related to white balance. The control unit sets the setting of white balance to any one setting mode included in a predetermined group when a setting mode of white balance is not a setting mode included in the predetermined group when the operating unit was operated. Moreover, the control unit sets the setting of white balance to a mode other than a present mode among the setting modes included in the predetermined group when the setting mode of white balance is a setting mode included in the predetermined group when the operating unit was operated. The plurality of setting values indicates a plurality of setting modes used for adjusting the tone of a captured image according to a photographing environment and a subject. The predetermined group is a group related to an auto mode in which setting of white balance is performed automatically. For example, the predetermined group includes "ambience priority auto mode" and "white priority auto mode". Moreover, "any one of setting modes included in the predetermined group" may be a previously set mode. In this case, the previously set mode may use any one of the auto modes as an initial value, and may be updated whenever the auto mode is set.

In the above-described embodiment, although an apparatus in which a touch bar (an operating member) and a digital camera (an imaging control apparatus) are integrated has been described as an example, the control on the digital camera may be performed using a touch bar mounted on an electronic apparatus separated from the digital camera.

The above-described various control operations described as being executed by the system control unit 50 may be performed by one hardware component, and the respective processes may be shared by a plurality of hardware components (for example, a plurality of processors or circuits) whereby the control of the entire apparatus is realized.

While the present invention has been described on the basis of the preferred exemplary embodiments, the present invention is not limited to these specific exemplary embodiments and various embodiments made without departing from the spirit of the present invention also fall within the scope of the present invention. Furthermore, the above-described respective exemplary embodiments illustrate exemplary embodiments of the present invention, and the respective exemplary embodiments may be combined appropriately.

In the above-described exemplary embodiments, although a case in which the present invention is applied to a digital camera has been described as an example, the present invention is not limited to this example, and the present invention can be applied to an electronic apparatus in which a touch sensor can be mounted or connected. That is, the present invention can be applied to, for example, a personal computer, a PDA, a mobile phone terminal, a mobile image viewer, a printer apparatus having a display, a digital photo frame, a music player, a gaming machine, an electronic book reader, and the like.

The present invention can be applied to a control apparatus that communicates with an imaging device (including a network camera) via cable or wireless communication and remotely controls the imaging device without being limited to the imaging device body. Examples of the apparatus that remotely controls the imaging device include a smartphone, a tablet PC, a desktop PC, and the like. By transmitting commands for various operations and settings from the control apparatus to the imaging device on the basis of an operation performed on the control apparatus or a process performed on the control apparatus, it is possible to remotely control the imaging device. Moreover, a live-view image captured by the imaging device may be received via cable or wireless communication and be displayed on the control apparatus.

Other Embodiments

The present invention is realized by executing the following processes. That is, software (a program) that realizes the functions of the above-described exemplary embodiments is supplied to a system or apparatus via a network or various storage media, and a computer (CPU, MPU, or the like) of the system or apparatus reads and executes the program codes. In this case, the program and a storage medium storing the program each form the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125356, filed on Jun. 29, 2018, which is hereby incorporated by reference herein in its entirety.

What is claimed is:

1. An imaging control apparatus comprising:
   a first operating member configured to select any of a plurality of options respectively corresponding to a plurality of settings including at least auto, daylight, and fluorescent, which relate to white balance;
   a second operating member; and
   at least one memory and at least one processor which function as:
   a control unit configured to perform control:
      to change white balance to a setting corresponding to a predetermined option in response to operation of the second operating member in a case where the setting of white balance is not a setting corresponding to the predetermined option among the plurality of options,
      to change white balance to another type of setting among a plurality of types of settings corresponding to the predetermined option in response to operation of the second operating member in a case where the setting of white balance is a setting corresponding to the predetermined option, and
      to change white balance to a setting other than the predetermined option in response to operation of the first operating member in a case where the setting of white balance is the setting corresponding to the predetermined option among the plurality of options.

2. The imaging control apparatus according to claim 1, wherein the plurality of options does not include a plurality of options respectively corresponding to the plurality of types of settings.

3. The imaging control apparatus according to claim 1, wherein the control unit is further configured to perform control to set white balance to a setting of the same type as in a previous setting corresponding to the predetermined option among the plurality of types of settings corresponding to the predetermined option in response to operation of the second operating member in a case where the setting of white balance is not a setting corresponding to the predetermined option.

4. The imaging control apparatus according to claim 1, wherein the predetermined option is an option corresponding to auto white balance.

5. The imaging control apparatus according to claim 1, wherein the setting corresponding to the predetermined option is the fluorescent.

6. The imaging control apparatus according to claim 5, wherein the setting of fluorescent includes a plurality of types of white balance settings for each color of fluorescent.

7. The imaging control apparatus according to claim 1, wherein the plurality of options further includes cloudy, shade, tungsten, strobe, and underwater.

8. The imaging control apparatus according to claim 1, further comprising:
   an imaging sensor;
   a finder; and
   a grip portion,
   wherein the second operating member is provided in a position at which the second operating member can be operated with the thumb of a hand holding the grip portion in a state in which user's eye is close to the finder.

9. The imaging control apparatus according to claim 1, wherein the at least one memory and at least one processor further function as:
a selecting unit configured to select any one of a plurality of groups obtained by classifying a plurality of allocatable functions; and
an allocating unit configured to allocate, after any of the plurality of groups is selected, any of a plurality of functions included in the selected group, excluding functions which are not included in the selected group, to each of a plurality of operations in response to an operation of a user,
wherein the allocating unit is further configured to be able to allocate a function to the second operating member.

10. The imaging control apparatus according to claim 1, wherein the second operating member is a touch operating member.

11. An imaging control apparatus comprising:
a first operating member configured to select any of a plurality of settings of options including at least auto, daylight, and fluorescent, related to white balance;
a second operating member; and
at least one memory and at least one processor which function as:
a control unit configured to perform control:
to change white balance to any one of a plurality of types of settings of the auto in response to operation of the second operating member in a case where the setting of white balance is not the auto among the plurality of settings,
to change white balance to another type of setting among the plurality of types of settings of the auto in response to operation of the second operating member in a case where the setting of white balance is the auto, and
to change white balance to a setting other than the auto in response to operation of the first operating member in a case where the setting of white balance is the auto.

12. The imaging control apparatus according to claim 11, wherein the plurality of settings of options does not include a plurality of options respectively corresponding to the plurality of types of settings of the auto.

13. The imaging control apparatus according to claim 11, wherein the control unit is further configured to perform control to set white balance to a setting of the same type as in the previous setting of auto among a plurality of types of settings of the auto in response to operation of the second operating member in a case where the setting of white balance is not the auto among the plurality of settings.

14. A control method of an imaging control apparatus including (1) a first operating member configured to select any of a plurality of options respectively corresponding to a plurality of settings including at least auto, daylight, and fluorescent, which relate to white balance; and (2) a second operating member, the control method comprising:
changing white balance to a setting corresponding to a predetermined option in response to operation of the second operating member in a case where the setting of white balance is not a setting corresponding to the predetermined option among the plurality of options,
changing white balance to another type of setting among a plurality of types of settings corresponding to the predetermined option in response to operation of the second operating member in a case where the setting of white balance is a setting corresponding to the predetermined option, and
changing white balance to a setting other than the predetermined option in response to operation of the first operating member in a case where the setting of white balance is the setting corresponding to the predetermined option among the plurality of options.

15. A control method of an imaging control apparatus including (1) a first operating member configured to select any of a plurality of settings of options including at least auto, daylight, and fluorescent, related to white balance; and (2) a second operating member, the control method comprising:
changing white balance to any one of a plurality of types of settings of the auto in response to operation of the second operating member in a case where the setting of white balance is not the auto among the plurality of settings,
changing white balance to another type of setting among the plurality of types of settings of the auto in response to operation of the second operating member in a case where the setting of white balance is the auto, and
changing white balance to a setting other than the auto in response to operation of the first operating member in a case where the setting of white balance is the auto.

16. A non-transitory computer readable medium that stores a program, wherein the program causes a computer to execute: a control method of an imaging control apparatus including (1) a first operating member configured to select any of a plurality of options respectively corresponding to a plurality of settings including at least auto, daylight, and fluorescent, which relate to white balance; and (2) a second operating member, the control method comprising:
changing white balance to a setting corresponding to a predetermined option in response to operation of the second operating member in a case where the setting of white balance is not a setting corresponding to the predetermined option among the plurality of options,
changing white balance to another type of setting among a plurality of types of settings corresponding to the predetermined option in response to operation of the second operating member in a case where the setting of white balance is a setting corresponding to the predetermined option, and
changing white balance to a setting other than the predetermined option in response to operation of the first operating member in a case where the setting of white balance is the setting corresponding to the predetermined option among the plurality of options.

17. A non-transitory computer readable medium that stores a program, wherein the program causes a computer to execute: a control method of an imaging control apparatus including (1) a first operating member configured to select any of a plurality of settings of options including at least auto, daylight, and fluorescent, related to white balance; and (2) a second operating member, the control method comprising:
changing white balance to any one of a plurality of types of settings of the auto in response to operation of the second operating member in a case where the setting of white balance is not the auto among the plurality of settings,
changing white balance to another type of setting among the plurality of types of settings of the auto in response to operation of the second operating member in a case where the setting of white balance is the auto, and changing white balance to a setting other than the auto in response to operation of the first operating member in a case where the setting of white balance is the auto.

\* \* \* \* \*